United States Patent [19]

Billias et al.

[11] 4,428,867
[45] Jan. 31, 1984

[54] ELECTRICALLY CONDUCTIVE STRUCTURAL ADHESIVE

[75] Inventors: Michael G. Billias, Decatur; Michael E. Borders, Marietta, both of Ga.

[73] Assignee: Lockheed Corporation, Burbank, Calif.

[21] Appl. No.: 317,020

[22] Filed: Nov. 2, 1981

[51] Int. Cl.$^3$ .............................................. H01B 1/02
[52] U.S. Cl. .................................. 252/512; 524/437; 156/305; 156/325; 156/330; 156/331.7; 523/440; 523/442
[58] Field of Search ................ 252/512, 511; 524/437; 156/305, 325, 326, 327, 330, 331.7, 332; 244/126, 1 R; 523/440, 442

[56] References Cited

U.S. PATENT DOCUMENTS

| | | | |
|---|---|---|---|
| 4,020,306 | 4/1977 | Zahner et al. | 523/440 |
| 4,081,423 | 3/1978 | Haidenfelt | 523/442 |
| 4,093,563 | 6/1978 | Eaton | 252/514 |
| 4,113,981 | 9/1978 | Fujita et al. | 252/511 |
| 4,145,328 | 3/1979 | Juneau et al. | 523/442 |

*Primary Examiner*—Josephine Barr
*Attorney, Agent, or Firm*—John J. Sullivan

[57] ABSTRACT

An adhesive is provided which comprises a thixotropic binder (24) containing metallic particles (23) of discrete size and specific density concentration. When used to bond faying surfaces (13 and 21/10 and 21) this adhesive is capable of conducting electrical currents on the order of 200,000 amps while withstanding structural loads on the order of 5000 psi. It has particular application in a highly volatile environment such as the skin panel (10) of an aircraft component housing an integral fuel tank (12). Lightning strike currents are thereby conducted in a controlled path (P) adjacent the exterior surfaces (S) of the component as defined by the parts (10, 13, 17 and 21) and arcing inside the fuel tank (12) is avoided.

7 Claims, 2 Drawing Figures

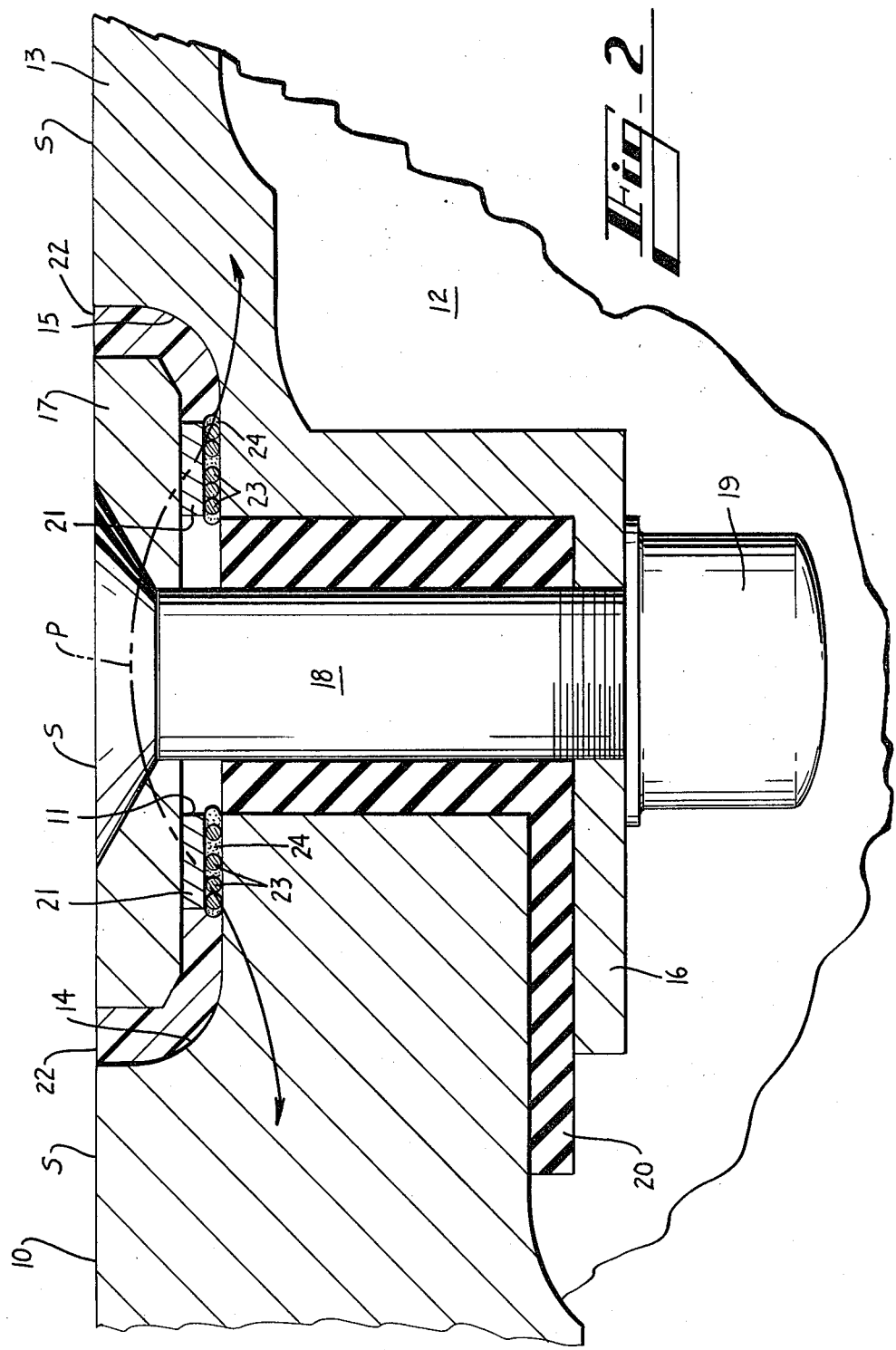

ELECTRICALLY CONDUCTIVE STRUCTURAL ADHESIVE

The Government has rights in this invention pursuant to Contract No. F33657-75-C-0178 awarded by the Department of the Air Force.

TECHNICAL FIELD

This invention relates generally to electrically conductive adhesives and more particularly to an electrically conductive adhesive that is capable of bonding conductive members in an assembly which will withstand structural loads on the order of 5000 pounds per square inch (34,470 Kilopascals) without failure while conducting electrical currents on the order of 200,000 amps in a controlled path to avoid arcing in a highly volatile environment.

BACKGROUND ART

The prior art pertinent to the present invention is represented by the following U.S. Pat. Nos. 3,359,145, Salyer et al., issued Dec. 19, 1967; 3,475,213, Stow, issued Oct. 28, 1969; 3,846,345, Mason et al., issued Nov. 5, 1974; 3,867,315, Tigner et al., issued Feb. 18, 1975; 3,919,122, Tigner, issued Nov. 11, 1975; 3,983,075, Marshall et al., issued Sept. 28, 1976; 4,093,563, Eaton, issued June 6, 1978; 4,113,981, Fujita et al., issued Sept. 12, 1978.

Stow discloses an electrically conductive adhesive tape wherein the adhesive layer contains electrically conductive particles, including aluminum, having a diameter approximately the same as the thickness of the adhesive layer and which may be spherical in shape and in volume approximately 0.1 to 40% of the volume of the adhesive.

Fujita et al. disclose an electrically conductive adhesive containing conductive particles of metal which are spherical in shape. Eaton is of interest for a discussion noting that spherical metal particles, including aluminum, may be placed in polymers to produce a highly conductive material. The remaining patents are of interest in that they relate to electrically conductive adhesives.

None of the above prior art disclosures, nor any prior art so far as is known, contemplates the application of a conductive adhesive in or adjacent a highly volatile environment, such as, for example, the fuel tank of a vehicle. Nor does the known prior art envision the degree of electrically conductive metallic particle concentration in a non-electrically-conductive adhesive binder as herein proposed in a high structural assembly.

DISCLOSURE OF INVENTION

In accordance with the present invention, an electrically conductive adhesive is proposed to bond conductive or metallic structures together which must withstand structural loads of up to about 5000 psi (34,470 kpa) and at the same time assure electrical continuity of about 200,000 amps across the bonded structure. Such a combination of bonding strength and current carrying ability is beyond the teachings of the prior art.

Consider, for example, the lightning strike test in aircraft having integral fuel tanks with associated removable and replaceable access doors. Because of the loads to which such doors are subjected during flight and the resulting movement of these doors relative to the adjacent airplane skin, sacrifical shims are employed. These shims are bonded to the airplane skin defining the access opening where they remain as an integral part of the skin when the door is removed and replaced an unlimited number of times.

In the foregoing installation the electrical conductivity of the adhesion employed to bond the shim must be high enough so that when the doors, fasteners and/or retaining rings are struck by lightning there will not be any arcing inside the fuel tank lest a fire or explosion results. Thus, the current must be made to pass along the door, the fastener and shim, and through the adhesive and airplane skin to dissipate and/or to ground. The adhesive herein contemplated has successfully passed such lightning strike tests, while other conductive adhesive such as those proposed in the above cited prior art do not have this degree of conductivity and cannot pass this test.

The adhesive herein proposed obtains the required degree of conductivity by incorporating metallic particles of discrete size and shape such that the electrical path is shortened and the conductors are of significant size to carry high current density. Prior art electrically conductive adhesive or sealants rely on high loading of finely divided particles, flakes or wires. The particle sizes covered in this disclosure are in the range of 4 to 10 mils or 0.004 to 0.008 inch (0.010 to 0.020 centimeters) in cross section. The electrical resistance of joints bonded with this material is in the range of $10^{-5}$ to $10^{-6}$ ohms per square inch (15 times $10^{-6}$ to 1.0 times $10^{-7}$ ohms per square centimeter).

The metallic particles herein proposed are incorporated into a structural adhesive binder such as epoxide, polyurethane or acrylic types with particle concentration maintained within the range of 9 to 13 percent by weight. Such loading of adhesive binder is totally outside the expectancy of the prior art teachings. On the contrary, from the prior art it would be expected that the loading as herein required would result in a degradation of the adhesive to the point that it would be unsuited to withstand the structural loads in the 5000 psi (34,470 kpa) range.

BRIEF DESCRIPTION OF THE DRAWINGS

FIG. 2 is a section taken along line 2—2 of FIG. 1 to show the composition of the adhesive as herein proposed and its use between metal elements of the wing and closure.

DETAILED DESCRIPTION AND STRUCTURE OF THE PREFERRED EMBODIMENT

Figure 1:
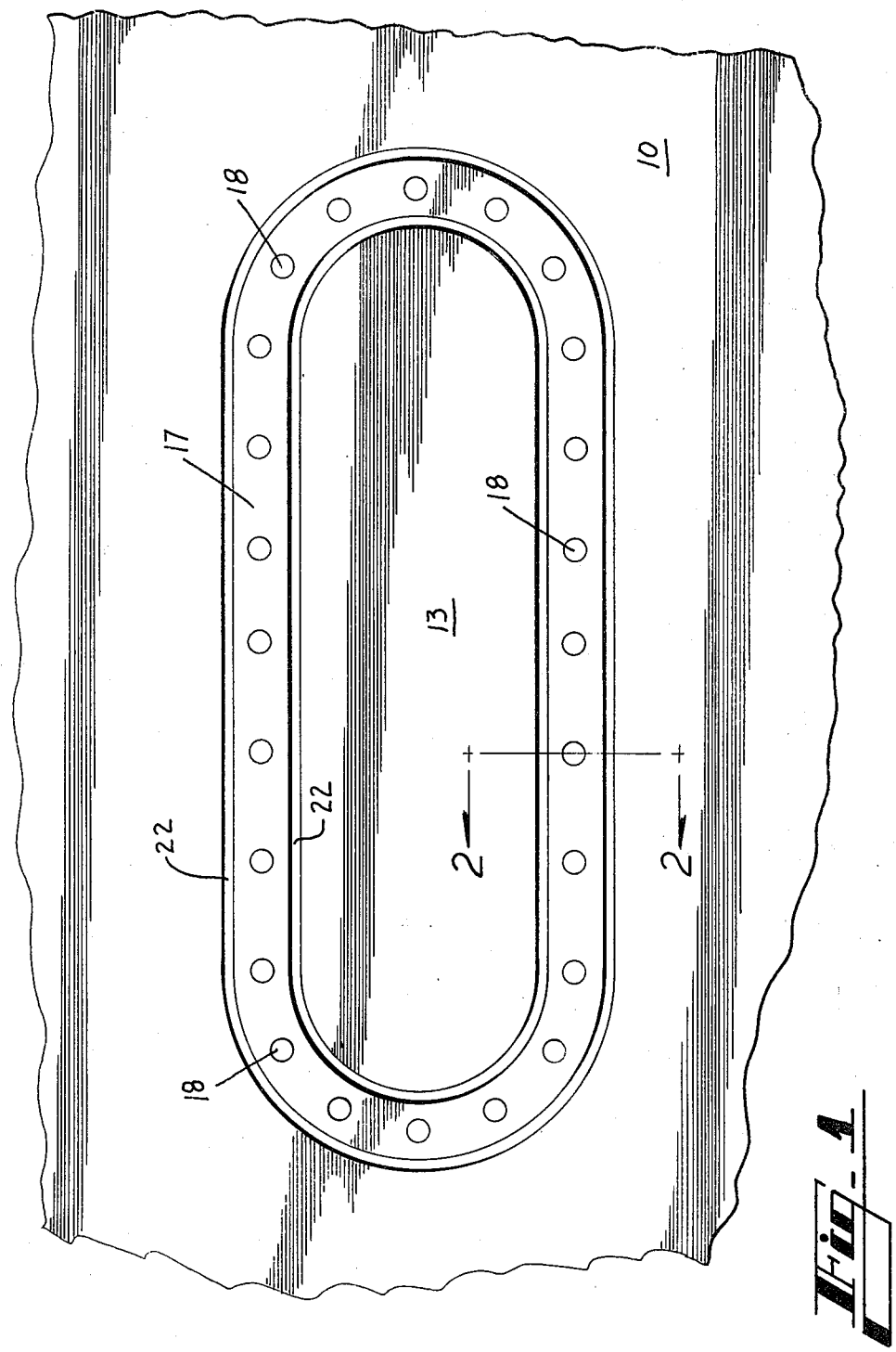
FIG. 1 is an elevation of a portion of an airplane component, such as, for example, a wing, in which is provided an access opening for an integral fuel tank with a removable and replaceable closure.

Referring more particularly to the drawings 10 designates the skin panel of a wing of an airplane in the area of and defining an access opening 11 to an internal fuel tank 12. A removable door 13 closes the opening 11, being designed and adapted to form an aerodynamically clean exterior surface S in the plane of the adjacent surface S of the skin panel 10. To this end the marginal edge portion of the door 13 is similarly recessed as at 15.

The door 13 terminates peripherally in an offset flange 16 adapted to clampingly engage the adjacent portion of the wing panel 10 defining the opening 11. Such clamping is effected by means of and through a retainer ring 17 operative on and against the surfaces of the panel 10 and door 13 defining the recesses 14 and 15 respectively. A number of removable and replaceable bolts 18 are employed to secure the retainer ring 17 and door to the skin panel 10, each bolt 18 acting in opposition to a corresponding nut 19 carried by the flange 16. A seal 20 is mounted on the shank of each bolt 18 and fills the area between the access door 13, the offset flange 16 and the wing skin panel 10 to provide a fuel seal.

In order to protect the areas of the door 13 and the skin panel 10 from wear or fretting due to relative movement thereof under normal operational loads, a sacrificial shim 21 is employed between each edge portion of the underside of the ring 17 and the associated surfaces of the door 13 and panel 10. While each of the shims 21 is removable and replaceable when worn, it is required that they be immovably secured to the associated door 13 and panel 10 when installed and during service. An appropriate sealant 22 of any conventional type may be employed in the recesses 14 and 15, i.e., the areas between the ring 17 and the adjacent surfaces of the panel 10 and the door 13 to prevent moisture entry as well as to fair or aerodynamically clean the exterior surface S formed by the skin panel 10, ring 17, bolt head 18 and access door 13.

The adhesive employed to secure each shim 21 is especially designed and fabricated to provide electrical continuity through and across the wing skin panel 10, the door 13, the ring 17 and the bolt 18. This electrical conductivity must be high enough to assure against any arcing inside the fuel tank 12 that can result in a fire or an explosion. This degree of conductivity is obtained by incorporating solid metallic particles 23 preferably of spherical or ellyptical shape of a discrete size in the range of 0.004 to 0.008 inch (0.010 to 0.020 centimeters) in cross section and preferably about 0.006 inch (0.015 centimeters) in a non-conductive binder 24 in a density in the range of approximately 9 to 13 percent by weight and preferably about 10 percent by weight such that the electrical path is shortened and a high current density is passed to and through the conductive panel 10 and door 13.

More specifically, the adhesive binder 24 is a two-part epoxy adhesive which consists primarily of a base compound consisting of a blend of epoxy resins, chopped glass and mineral fibers and rubber particles with a catalyst preferably an aliphatic amine. These components are not critical in the electrical conductivity of the material. The basic requirement for the adhesive binder 24 is that it must be a thixotropic paste type capable of keeping the dispersed, conductive aluminum particles 23 suspended throughout. The viscosity is in a range from 6,000 to 12,000 poise (600 to 1200 paschal seconds). The cured adhesive binder 24 itself is a non-electrically conductive material. The electrically conductive particles 23 are added to reduce the resistivity of the material.

The particles 23 used are atomized metal, preferably aluminum, that are either spherical or elliptical in shape. The particles 23 are of a discrete size. They must be able to pass through an ASTM 80 mesh (0.0175 centimeters) screen and retained on an ASTM 120 mesh (0.0124 centimeters) screen. The diameter of each of the particles 23 ranges from 0.004 to 0.008 inch (0.010 to 0.020 centimeters).

METHOD OF APPLYING THE ADHESIVE

The particles 23 are thoroughly cleaned and degreased following conventional practices so that maximum conductivity is assured. Before catalization of the adhesive the particles 23 are mixed with the base component of the binder 24. Such mixing is thorough to assure total dispersement of the particles 23 throughout the binder 24. This is followed by a thorough mixing of the catalyst of the adhesive binder 24.

In order for the adhesive to be electrically conductive, it must be used in faying surface bonding applications between two conductive surfaces, in this case each sacrifical shim 21 and the associated door 13 or wing panel 10. There must be sufficient clamp-up pressure, about 100 pounds per square inch (689.48 kilopascals), during the cure cycle of the adhesive to insure metal particle 23 to metal (shim 21 to door 13 and shim 21 to panel 10) contact through the adhesive.

With the shims 21 thus secured to the door 13 and to the skin panel 10, the door 13 may now be installed in the access opening 11. The flange 16 of the door 13 is disposed under the peripheral edge portion of the panel 10 and the retainer ring 17 is placed in the recesses 14, 15 to rest on the shims 21. The bolts 18 are now tightened in their respective nuts 19 carried by the flange 16 and the installation is complete when the surface S is formed by the outer surfaces of the panel 10, ring 17, bolt head 18 and door 13. The sealant 22 is then injected into the area of the recesses 14 and 15 defining the ring 17. Removal and replacement of the door 13 any number of times thereafter is possible whereby the shims 21 remain secured to their respective panel 10 and door 13.

OPERATION OF THE PREFERRED EMBODIMENT

When installed and secured as above described the door 13 is, in effect, an integral part of the wing skin panel 10, however, because of the clamping, attachment loads acting on the wing during operation of the airplane do not pass through the door 13. In so doing some relative movement or flexing occurs between the door 13 and the panel 10 which causes wear or fretting of the shims 21. Worn shims 21 may from time to time be removed and replaced with new shims 21 with no impairment to the structure of the door 13 or panel 10.

At the same time when the door 13 is installed in the wing panel 10 lightning strikes which may occur on the panel 10, the door 13 or ring 17 produce an electric current which is made to pass freely therethrough remote from the interior of the tank 12. The path P of these currents (arrows in FIG. 2) are directed and controlled proximate the outer surface S because of the electrical continuity through the conductive door 13, wing 17 and panel 10 afforded by the electrically conductive adhesive 23-24 of this invention.

We claim:

1. An adhesive for bonding two conductive members to withstand structural loads on the order of 5000 pounds per square inch without failure while conducting electrical currents on the order of 200,000 amps in a controlled path comprising a structural adhesive binder of thixotropic paste having a viscosity in the range of from 6,000 to 12,000 poise in which discrete aluminum particles are thoroughly mixed throughout in a concentration maintained within the range of approximately 9 to 13 percent by weight, the size of each said particle being in the range of approximately 0.004 to 0.008 inch in cross-section and adapted to contact the faying surfaces of said conductive members at all times when assembled to provide a permanently conductive adhesive.

2. The adhesive of claim 1 wherein said particle concentration is about 10 percent by weight.

3. The adhesive of claim 1 wherein said particle size is about 0.006 inch in cross-section.

4. The adhesive of claim 1 wherein said conductive members are a sacrificial shim disposed between the marginal edge of an access opening in the skin panel of an airplane in the area of an integral fuel tank therein and the marginal edge of a removable door closing said opening.

5. The adhesive of claim 4 wherein two shims of the same thickness are employed, one surface of one said shim being secured to said marginal edge of said opening and the corresponding surface of another said shim being secured to said marginal edge of said door, and including a retainer ring overlying and abutting the other corresponding surfaces of said shims and nut and bolt means removably securing said retainer ring in the shim abutting position aforesaid.

6. The adhesive of claim 5 wherein the dimensions of said ring and nut and bolt means are such as to dispose the outer surfaces thereof in a common plane with the adjacent surfaces of said door and said panel when removably secured as aforesaid and including a sealant filling the spaces between said ring and panel and said ring and door.

7. The adhesive of claim 1 wherein said structural adhesive binder is an epoxy.

* * * * *